(12) United States Patent
Chang

(10) Patent No.: US 6,643,428 B2
(45) Date of Patent: Nov. 4, 2003

(54) OPTICAL FIBER COLLIMATOR AND METHOD FOR FABRICATING THE SAME

(75) Inventor: Sean Chang, Tao Yuan (TW)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 10/189,083

(22) Filed: Jul. 3, 2002

(65) Prior Publication Data

US 2003/0133654 A1 Jul. 17, 2003

(30) Foreign Application Priority Data

Jan. 15, 2002 (TW) .................................. 91100518 A

(51) Int. Cl.[7] .................................................. G02B 6/32
(52) U.S. Cl. ............................ 385/33; 385/31; 385/124
(58) Field of Search ........................... 385/27, 28, 31, 385/33, 42, 123, 124

(56) References Cited

U.S. PATENT DOCUMENTS

| | | | | |
|---|---|---|---|---|
| 4,817,205 A | * | 3/1989 | Asawa | 455/612 |
| 5,077,814 A | * | 12/1991 | Shigematsu et al. | 385/24 |
| 5,416,862 A | * | 5/1995 | Haas et al. | 385/28 |
| 6,157,757 A | * | 12/2000 | Giaretta et al. | 385/35 |
| 2002/0114568 A1 | * | 8/2002 | Judkins | 385/34 |

* cited by examiner

Primary Examiner—Phan T. H. Palmer
(74) Attorney, Agent, or Firm—Martine & Penilla, LLP

(57) ABSTRACT

Disclosed is an optical fiber collimator including a single-mode fiber and a graded-index multi-mode fiber. The graded-index multi-mode fiber is spliced with the single-mode fiber and has a predetermined length so as to collimate light rays. The waveform of the light rays in the graded-index multi-mode fiber has a period P during the transmission and the length of the graded-index multi-mode is substantially $0.25 \times N \times P$, wherein N is a positive odd number.

16 Claims, 3 Drawing Sheets

OPTICAL FIBER COLLIMATOR AND METHOD FOR FABRICATING THE SAME

BACKGROUND OF THE INVENTION (a) Field of the Invention

The invention relates to a collimator and, in particular, to a fiber collimator employing a graded-index multi-mode fiber to collimate light rays.

(b) Description of the Related Art

In optical devices or systems, a collimator is a commonly used optical device, which collimates an optical signal into a parallel light so as to reduce divergence of light beam.

In conventional technology, the collimator employs a graded-index lens (GRIN lens) to change the divergent angle of divergent light entered from a single-mode fiber such that the divergent light is changed into parallel emitted light to be coupled to other optical devices.

However, the volume of such a collimator is relatively large and the outer diameter of the collimator is about 1.8 mm. Thus, it is not suitable to be used in optical devices with a small size, for instance, a micro-electromechanical system (MEMS) switch or a planar waveguide device.

SUMMARY OF THE INVENTION

In view of the above, an object of the invention is to provide an optical fiber collimator and a method for fabricating the same, wherein the collimator occupies a smaller space, which suits optical devices having a smaller volume.

To achieve the above object, the optical fiber collimator of the invention includes a single-mode fiber and a graded-index multi-mode fiber. The graded-index multi-mode fiber is spliced with the single-mode fiber and has a predetermined length so as to collimate light rays. The waveform of the light rays within the graded-index multi-mode fiber has a period P during transmission and the length of the graded-index multi-mode is substantially $0.25 \times N \times P$, wherein N is a positive odd number.

The graded-index multi-mode fiber is spliced with single-mode fiber by fusion splicing or adhesive splicing. A protective film covers the coupling point between the single-mode fiber and the graded-index multi-mode fiber so as to prevent the single-mode fiber and the graded-index multi-mode fiber from breakage at the coupling point.

After the single-mode fiber is spliced with the graded-index multi-mode fiber, the length of the graded-index multi-mode fiber is adjusted by heating or stretching, such that the substantial length of the graded-index multi-mode fiber is $0.25 \times N \times P$. In addition, a UV-sensitive graded-index multi-mode fiber is used to change the gradient of the refractive index, and in turn, the period P of the light rays transmitted in the graded-index multi-mode fiber is changed.

In the course of adjustment of the graded-index multi-mode fiber, a light beam is coupled to the graded-index multi-mode fiber, and a power meter is used to detect the output of the single-mode fiber so as to determine whether the graded-index multi-mode fiber has been fully adjusted. In addition, the light beam is also coupled to the single-mode fiber and a beam scanner is used to inspect the size of the section of the beam output from the graded-index multi-mode fiber so as to determine whether the graded-index multi-mode fiber has been fully adjusted.

DETAILED DESCRIPTION OF THE INVENTION

The preferred embodiments of the optical fiber collimator of the invention and the method for fabricating the same is described in accompany with the drawings, wherein parts with same numeral numbers are referred to the same elements.

Figure 1:
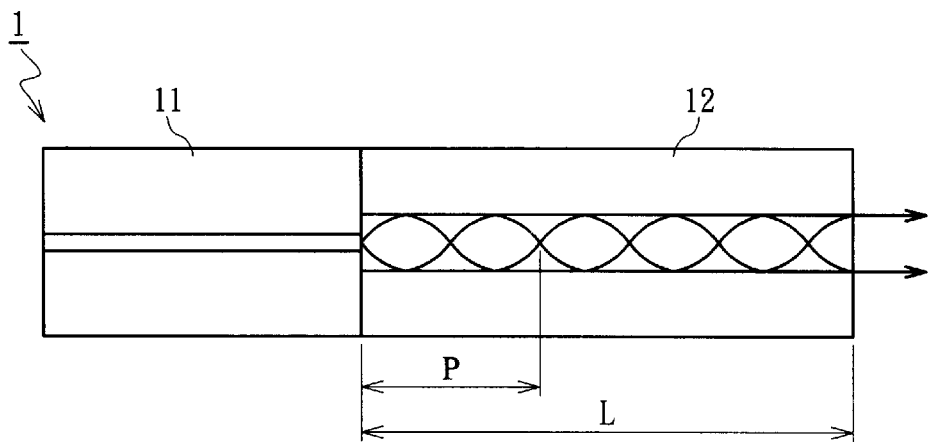
FIG. 1 is a schematic view showing the structure of an optical fiber collimator in accordance with an embodiment of the invention.

As shown in FIG. 1, an optical fiber collimator 1 of the present invention includes a single-mode fiber 11 and a graded-index multi-mode fiber 12. In the single-mode fiber 11, light rays are directed by total reflection. In the graded-index multi-mode optical fiber 12, the refractive index is continuously changed towards the direction of axis of the optical fiber. Thus, in the graded-index multi-mode optical fiber 12, the light rays travel in a waveform with a period P.

In the preferred embodiment, the relation of the length L and the period P of the graded-index multi-mode fiber 12 is as follows:

$$L = 0.25 \times N \times P$$

wherein N is a positive odd number. If the length L and the period P are in compliance with the above relation, the light rays, after passed through the graded-index multi-mode fiber 12, are substantially emitted in parallel. In addition, the graded-index multi-mode optical fiber 12 and the single-mode optical fiber 11 can be spliced together by various methods, such as fusion splicing or adhesive splicing.

The method for fabricating the optical fiber collimator 1 of the present invention is described in accompany with the drawings.

Figure 2A:
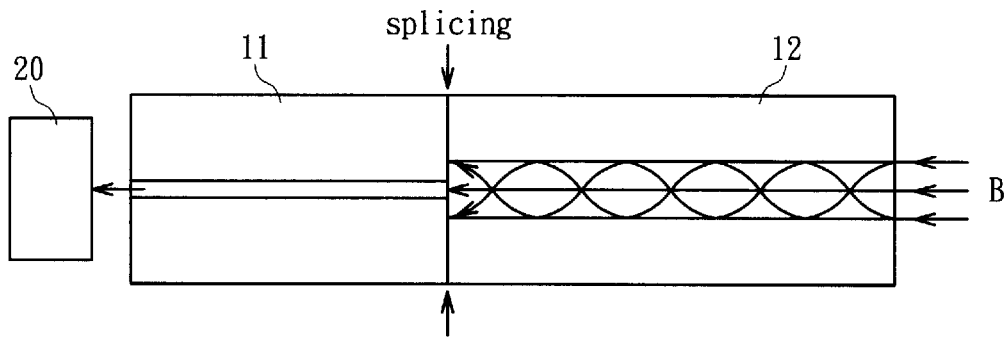
FIGS. 2A and 2B are schematic views showing a method of fabricating an optical fiber collimator in accordance with an embodiment of the invention.
Figure 2B:
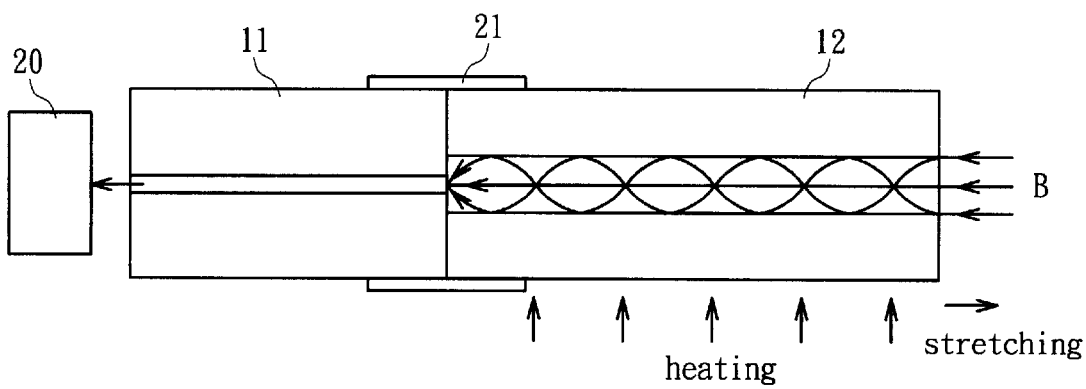

Referring to FIGS. 2A and 2B, in accordance with a preferred embodiment of the invention, a graded-index multi-mode optical fiber 12 and a single-mode optical fiber 11 are fused together, and the end face of the graded-index multi-mode optical fiber 12 is polished. Next, a light beam B is transmitted into the graded-index multi-mode optical fiber 12, and at the same time, an optical power meter 20 is used to monitor the light beam output from the single-mode fiber 11. The light beam B can be light rays output from another collimator.

After the light beam B has been transmitted into the graded-index multi-mode optical fiber 12, the graded-index multi-mode optical fiber 12 is heated and slowly stretched to change the length thereof. During the process of slowly stretching the graded-index multi-mode fiber 12, the status of convergence of light rays transmitted from the graded-index multi-mode optical fiber 12 to the single-mode optical fiber 11 can be detected by monitoring the output of the optical power meter 20. If the output of the optical power meter 20 has the greatest power, it shows that the light beam B transmitted in the graded-index multi-mode optical fiber 12 has fully converged to the single-mode optical fiber. At this instance, the processes of heating and stretching the graded-index multi-mode optical fiber 12 are stopped, and the fusion point is covered with a protective film 21 to avoid breakage of the coupling point.

Figure 3A:
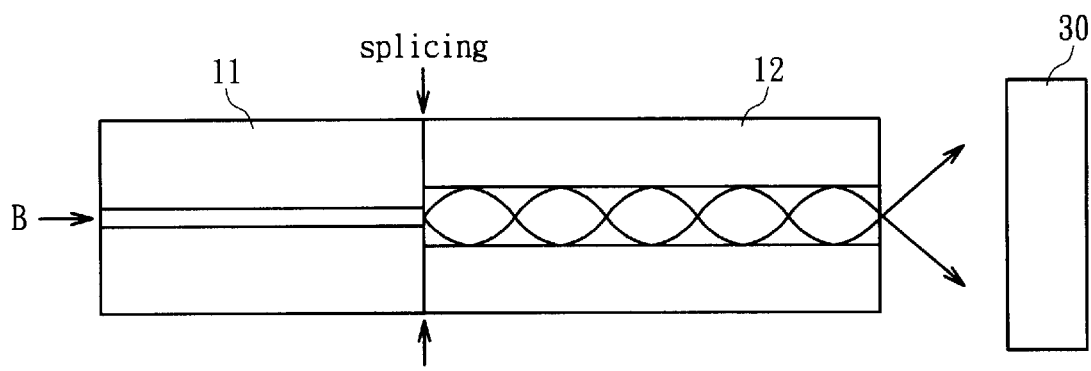
FIGS. 3A and 3B are schematic views showing a method of fabricating an optical fiber collimator in accordance with another embodiment of the invention.
Figure 3B:
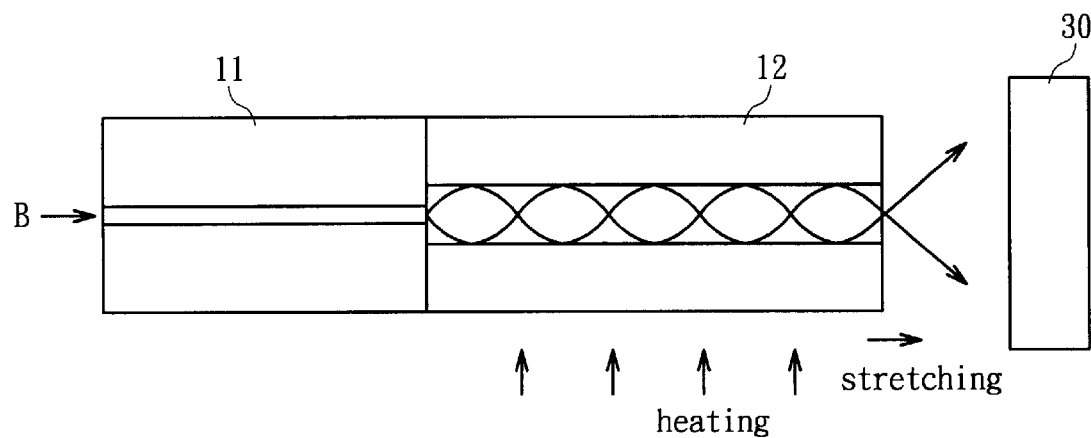

Referring to FIGS. 3A and 3B, there is shown another embodiment of the invention. The graded-index multi-mode optical fiber 12 and the single-mode optical fiber 11 are fused together in advance and the end face of the graded-index multi-mode optical fiber 12 is polished. Next, the light beam B is directed to the single-mode optical fiber 11. At the same time, a beam scanner 30 is used to monitor the size of section of the light output from the graded-index multi-mode optical fiber 12.

At this instance, the graded-index multi-mode optical fiber 12 is heated and is stretched slowly so as to change the length thereof. During the process of stretching, the size of section of the light is monitored by the beam scanner 30 to detect whether the light from the graded-index multi-mode optical fiber 12 is output substantially in parallel. If the output result of the beam scanner 30 indicates that the light from the graded-index multi-mode optical fiber 12 is output substantially in parallel, then the processes of heating and stretching on the graded-index multi-mode optical fiber 12 are stopped, and the fusion point is covered with the protective film 21 to prevent breakage at the coupling point.

Figure 4:
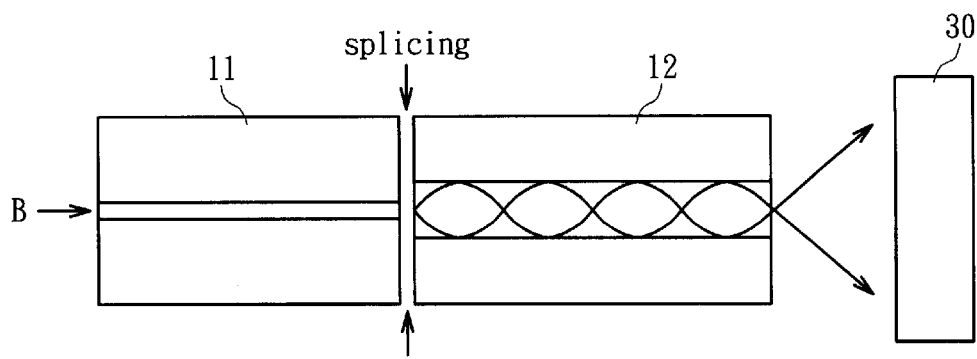
FIG. 4 is a schematic view showing a method of fabricating an optical fiber collimator in accordance with a further embodiment of the invention.

Referring to FIG. 4, there is shown another embodiment in accordance with the invention. The length of the graded-index multi-mode optical fiber 12 is pre-calculated and is about 0.25×N×P, wherein N is a positive odd number, P is the period of waveform of the light directed in the graded-index multi-mode optical fiber 12. One end of the single- with a light source such that the light beam B can enter the single-mode optical fiber 11.

Next, the relative position between the single-mode optical fiber 11 and the graded-index multi-mode optical fiber is adjusted and a beam scanner 30 is used to monitor the size of section of the light output from the graded-index multi-mode optical fiber 12. If the output result of the beam scanner 30 indicates that the light from the graded-index multi-mode optical fiber 12 is output substantially in parallel, the coupling point of the single-mode optical fiber 11 and the graded-index multi-mode optical fiber 12 is added with a fixing adhesive so as to secure their relative position.

Figure 5A:
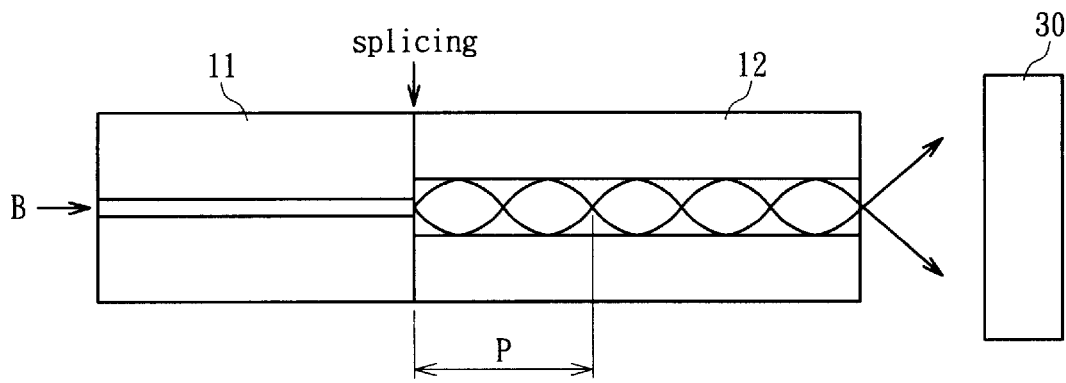
FIGS. 5A and 5B are schematic views showing a method of fabricating an optical fiber collimator in accordance with another further embodiment of the invention.
Figure 5B:
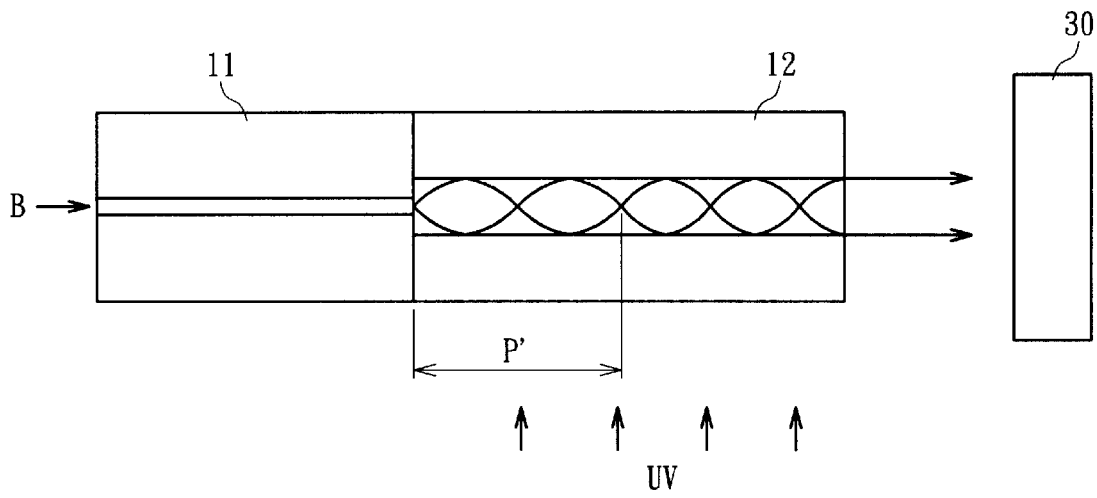

In accordance with the invention, the graded-index multi-mode optical fiber can be a UV-sensitive graded-index multi-mode fiber, and UV rays are used to change the gradient of the refractive index thereof so as to change the period P. For instance, referring to FIGS. 5A and 5B, after the graded-index multi-mode optical fiber 12 is fused with the single-mode optical fiber 11, the graded-index multi-mode optical fiber 12 can receive the UV radiation so as to change the gradient of refractive index and in turn, the period P of the light waveform is changed. Thus, if the output result of the beam scanner 30 indicates that the light of the graded-index multi-mode optical fiber 12 is output in parallel, UV radiation on the graded-index multi-mode optical fiber 12 is stopped and the fused point is covered with a protective film 21 to avoid breakage of the coupling point.

The optical fiber collimator of the present invention employs a graded-index multi-mode optical fiber with a smaller size (outer diameter being 0.125 mm) to replace the larger graded-index lens (outer diameter being about 1.8 mm), the size of the collimator is effectively reduced. When a smaller optical device is selected, the optical fiber collimator can effectively resolve the problem caused by a larger size collimator.

Although the invention has been described in terms of the preferred embodiments, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. An optical fiber collimator comprising:

a single-mode fiber for transmitting light rays; and a graded-index multi-mode fiber coupled with the single-mode fiber, for collimating the light rays;

wherein the light rays are substantially parallel after passing through the graded-index multi-mode fiber.

2. The optical fiber collimator of claim 1, wherein the light rays transmitted in the graded-index multi-mode fiber has a waveform with a period P, and the length of the graded-index multi-mode fiber is substantially 0.25×N×P, wherein N is a positive odd number.

3. The optical fiber collimator of claim 1, wherein the graded-index multi-mode fiber is coupled with the single-mode fiber by fusion splicing.

4. The optical fiber collimator of claim 1, wherein the graded-index multi-mode fiber is coupled with the single-mode fiber by adhesive splicing.

5. The optical fiber collimator of claim 1, further comprising a protective film that covers a coupling point of the single-mode optical fiber and the graded-index multi-mode optical fiber.

6. A method for fabricating an optical fiber collimator comprising the steps of:

coupling a graded-index multi-mode optical fiber with a single-mode optical fiber; and detecting light rays passing through the graded-index multi-mode optical fiber and the single-mode optical fiber with a light detector, and adjusting the graded-index multi-mode optical fiber such that the graded-index multi-mode optical fiber collimates the light rays passing therethrough to be substantially parallel.

7. The method of claim 6, wherein the coupling step is executed by fusion splicing.

8. The method of claim 6, wherein the coupling step is executed by adhesion splicing.

9. The method of claim 6, wherein the light detector is a power meter.

10. The method of claim 6, wherein the light detector is a beam scanner.

11. The method of claim 6, wherein the adjusting step includes heating and stretching the graded-index multi-mode optical fiber.

12. The method of claim 6, wherein the adjusting step includes irradiating the graded-index multi-mode optical fiber by UV rays.

13. The method of claim 6, further comprising:

polishing an end face of the graded-index multi-mode optical fiber.

14. The method of claim 6, further comprising:

covering a coupling point of the single-mode optical fiber and the graded-index multi-mode optical fiber with a protective film.

15. The method of claim 6, wherein the adjusting step includes:
adjusting a relative position of the single-mode optical fiber and the graded-index multi-mode optical fiber; and
adding a fixing adhesive to secure the single-mode optical fiber and the graded-index multi-mode optical fiber.

16. An optical fiber collimator comprising:
a single-mode fiber for transmitting light rays; and
a graded-index multi-mode fiber coupled with the single-mode fiber for collimating the light rays,
wherein the light rays transmitted in the graded-index multi-mode fiber has a waveform with a period P, and the length of the graded-index multi-mode fiber is substantially $0.25 \times N \times P$, wherein N is a positive odd number.

* * * * *